(12) United States Patent
Meng et al.

(10) Patent No.: US 9,906,337 B2
(45) Date of Patent: Feb. 27, 2018

(54) NETWORK APPARATUS AND COMMUNICATION DEVICE FOR AGGREGATED COMPONENT CARRIERS

(71) Applicant: HTC Corporation, Taoyuan (TW)

(72) Inventors: Ling-San Meng, Taoyuan (TW); Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 108 days.

(21) Appl. No.: 15/001,183

(22) Filed: Jan. 19, 2016

(65) Prior Publication Data

US 2016/0211952 A1 Jul. 21, 2016

Related U.S. Application Data

(60) Provisional application No. 62/105,223, filed on Jan. 20, 2015.

(51) Int. Cl.
| | | |
|---|---|---|
| H04B 7/00 | (2006.01) | |
| H04L 5/00 | (2006.01) | |
| H04L 5/14 | (2006.01) | |
| H04W 52/02 | (2009.01) | |
| H04W 52/14 | (2009.01) | |
| H04W 52/34 | (2009.01) | |
| H04W 52/32 | (2009.01) | |

(52) U.S. Cl.
CPC ............ *H04L 5/001* (2013.01); *H04L 5/0053* (2013.01); *H04L 5/14* (2013.01); *H04W 52/0212* (2013.01); *H04W 52/146* (2013.01); *H04W 52/34* (2013.01); *H04W 52/325* (2013.01)

(58) Field of Classification Search
CPC ... H04W 16/24; H04W 16/32; H04W 76/025; H04W 76/028; H04W 76/04; H04W 76/048
USPC .................. 370/310, 328, 329, 343, 345
See application file for complete search history.

(56) References Cited

U.S. PATENT DOCUMENTS

| | | | | |
|---|---|---|---|---|
| 8,854,976 B2* | 10/2014 | Xi | ........................ | H04L 5/001 370/225 |
| 9,281,930 B2* | 3/2016 | Kim | ..................... | H04L 5/1469 |
| 9,313,743 B2* | 4/2016 | Kwon | ................. | H04W 52/146 |
| 9,374,795 B2* | 6/2016 | Hwang | ............... | H04W 56/002 |
| 9,520,984 B2* | 12/2016 | Yang | .................. | H04W 52/146 |
| 9,538,456 B2* | 1/2017 | Yi | ....................... | H04W 48/20 |
| 9,629,097 B2* | 4/2017 | Ahn | .................... | H04W 52/146 |
| 9,713,095 B2* | 7/2017 | Kwon | ................. | H04W 52/146 |
| 2014/0086213 A1* | 3/2014 | Kwon | .............. | H04W 36/0055 370/331 |

(Continued)

OTHER PUBLICATIONS

Multiplexing and channel coding, 3GPP TS 36.212, V11.0.0, Sep. 2012.

(Continued)

*Primary Examiner* — Dmitry H Levitan
(74) *Attorney, Agent, or Firm* — Winston Hsu

(57) ABSTRACT

A network apparatus communicates with a user equipment via multiple component carriers. The network apparatus is capable of configuring cells to correspond to the component carriers, grouping the cells into cell groups, each including cells less than or equal to a predetermined number, selecting one from the cells to be a primary cell for each cell group, and receiving a physical uplink control channel (PUCCH) on an uplink (UL) CC of the primary cell for one of the at least one CG.

15 Claims, 6 Drawing Sheets

(56) References Cited

U.S. PATENT DOCUMENTS

2015/0098441 A1* 4/2015 Peng .................. H04W 72/042
370/330

OTHER PUBLICATIONS

Physical Layer Procedures, 3GPP TS 36.213, V11.0.0, Sep. 2012.
3GPP TS 36.213 V12.12.0 (Sep. 2017), "3rd Generation Partnership Project; Technical Specification Group Radio Access Network; Evolved Universal Terrestrial Radio Access (E-UTRA); Physical layer procedures (Release 12)", pp. 1-241.
3GPP TS 36.213 V13.7.0 (Sep. 2017), "3rd Generation Partnership Project; Technical Specification Group Radio Access Network; Evolved Universal Terrestrial Radio Access (E-UTRA); Physical layer procedures (Release 13)", pp. 1-378, 380-391.

* cited by examiner

NETWORK APPARATUS AND COMMUNICATION DEVICE FOR AGGREGATED COMPONENT CARRIERS

CROSS REFERENCE TO RELATED APPLICATIONS

This application claims the benefit of U.S. Provisional Application No. 62/105,223 filed on Jan. 20, 2015, the contents of which are incorporated herein.

BACKGROUND OF THE INVENTION

1. Field of the Invention

The present invention is related to a network apparatus and communication device, and more particularly, to a network apparatus and communication device capable of grouping aggregated component carriers.

2. Description of the Prior Art

Carrier aggregation (CA) is first introduced in long-term evolution advanced (LTE-Advanced or 3GPP Release 10) standard in order to increase the bandwidth and thereby increase the bitrate. Each aggregated carrier is referred as a component carrier (CC). The CC can have a bandwidth of 1.4, 3, 5, 10, 15 or 20 MHz and a maximum of five CCs can be aggregated, hence the maximum aggregated bandwidth is 100 MHz.

The CA can be used for both frequency division duplexing (FDD) LTE and time division duplexing (TDD) LTE systems. In the FDD LTE system, a number of CCs can be different in downlink (DL) and uplink (UL). However, the number of UL CCs is always equal to or less than the number of DL CCs. Notably, the individual CCs can also be of different bandwidths.

In order to be compatible with previous LTE standards, such as 3GPP Release 8 and 3GPP Release 9, the CA is arranged to use contiguous CCs within a same operating frequency band, so-called intra-band contiguous CA. However, such an arrangement might not be always possible due to practical operator frequency allocation limits. On the other hand, non-contiguous CCs allocation might be either an intra-band, i.e. the CCs belong to a same operating frequency band having a gap or gaps between the CCs, or an inter-band in which the CCs belong to different operating frequency bands.

The CA of the 3GPP Release 10 enables aggregation of up to 5 carriers of the same frame structure. Extensions of the basic carrier aggregation framework nowadays enable inter-band TDD CA with different UL-DL configurations, CA with multiple UL timing advance (in 3GPP Release 11), and aggregation of carriers with different frame structures through FDD-TDD CA (in 3GPP Release 12). To more efficiently utilize the available spectrum for communication requirements, extension of the CA framework beyond 5 carriers to 32 CCs is considered and discussed in 3GPP Release 13.

However, not all the CA aspects scale directly with an increasing number of CCs. For example, if the number of CA capable user equipments (UEs) and (or) the aggregated CCs increase, a cell used as the primary cell (PCell) will be highly loaded because there are key features which are only applied to the PCell, i.e. a feedback of an uplink control information (UCI) in a physical uplink control channel (PUCCH). The increase of the number of supported CCs results in an even greater increase for the required PUCCH payload size per CA UE, which leads to a severe impact on PCell UL load with increasing number of CA UEs. Accommodating all the PUCCH transmissions in the PCell apparently impacts performance, especially for the non-CA UEs. Therefore, the requirement to accommodate all the PUCCH transmissions in the PCell hinders the development to future CA enhancement. Also, the mechanism for UL power control does not scale with the increasing CCs.

Therefore, the LTE system has to be further developed to deal with the increase of the supported CCs.

SUMMARY OF THE INVENTION

It is therefore an objective of the present invention to provide a network apparatus and communication device.

The present invention discloses a network apparatus, communicating with a user equipment (UE) via a plurality of component carriers (CCs), the network apparatus comprising a storage unit for storing instructions of configuring a plurality of cells, each corresponding to at least one of the plurality of CCs; grouping the plurality of cells into at least one cell group (CG), wherein each of the at least one CG comprises cells less than or equal to a predetermined number; selecting one cell from the plurality of cells to be a primary cell for one of the at least one CG; and receiving a physical uplink control channel (PUCCH) on an uplink (UL) CC of the primary cell for one of the at least one CG; a processing means, coupled to the storage unit, configured to execute the instructions stored in the storage unit.

The present invention further discloses a communication device, communicating with at least one network apparatus via a plurality of component carriers (CCs), the communication device comprising a storage unit for storing instructions of receiving a configuration sent by the at least one network apparatus, wherein the configuration indicates that a plurality of cells correspond to the plurality of CCs, and indicates that the plurality of cells are grouped into at least one cell group (CG); allocating an uplink (UL) transmission power of the communication device to the at least one CGs according to a priority order of the at least one network apparatus; if there is remaining UL transmission power unallocated, then allocating the remaining UL transmission power across all the at least one CGs across all the at least one network apparatus according to an uplink control information (UCI)-content priority rule; and after the UL transmission power is allocated to the transmissions with UCI, scaling all unallocated physical uplink shared channels (PUSCHs) within the same CG by a same power scaling coefficient such that the UL transmission power is not exceeded; a processing means, coupled to the storage unit, configured to execute the instructions stored in the storage unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
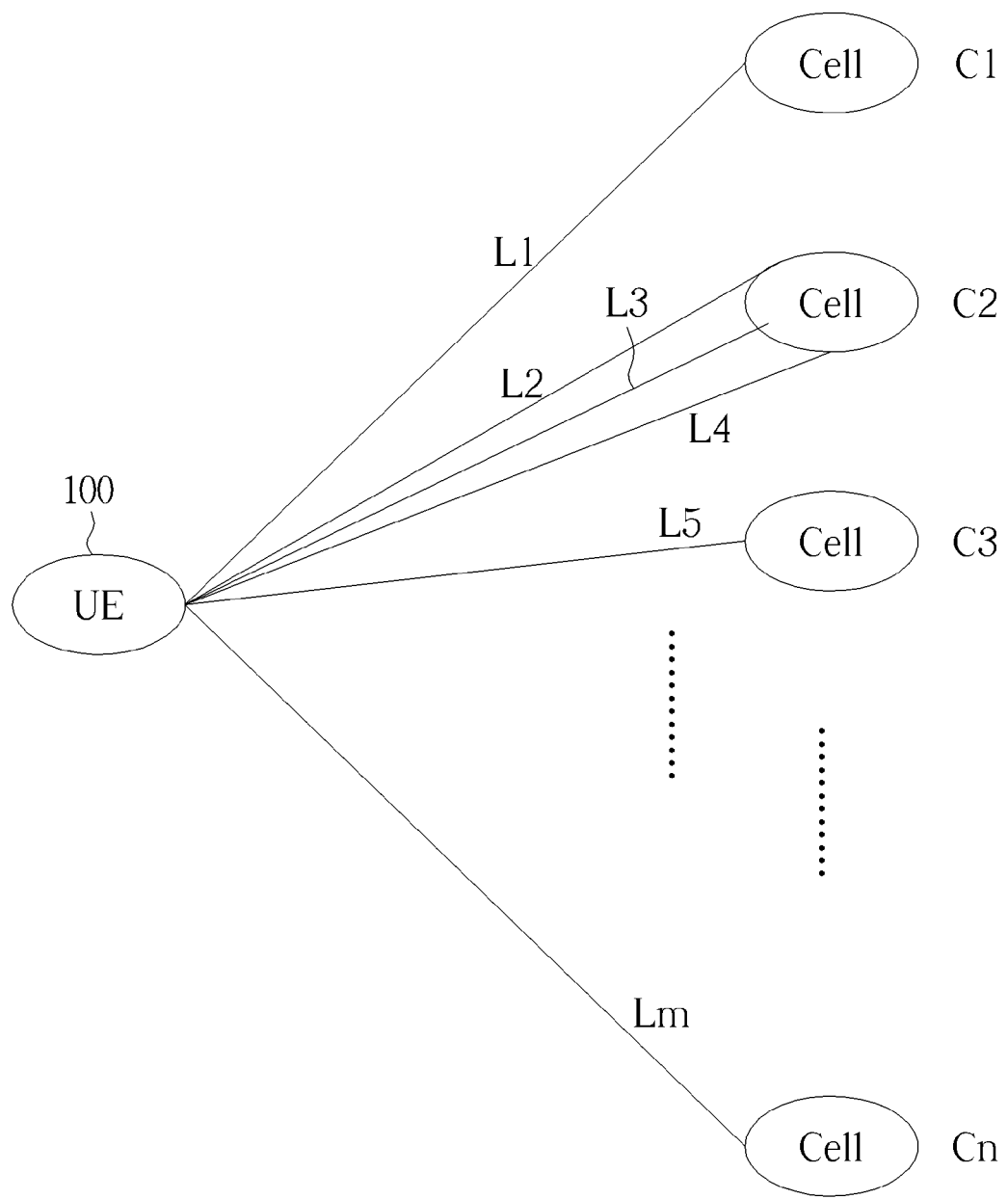
FIG. 1 is a schematic diagram of connections between a user equipment and multiple cells.

Please refer to FIG. 1, which is a schematic diagram of connections between a user equipment (UE) 100 and multiple cells C1-Cn. According to FIG. 1, the cells C1-Cn and the UE 100 are communicated through links L1-Lm. Each of the links L1-Lm corresponds to a component carrier (CC) configured for the UE 100, and supports a long-term evolution (LTE) radio access technology (RAT) or an evolved universal terrestrial radio access network (E-UTRAN) RAT. For example, the UE 100 is communicated with the cell C1 through the link L1, and is communicated with the cell C2 through the links L2-L4, and so on. Normally, the UE 100 performs a random access procedure for uplink synchronization and initial cell access.

Figure 2:
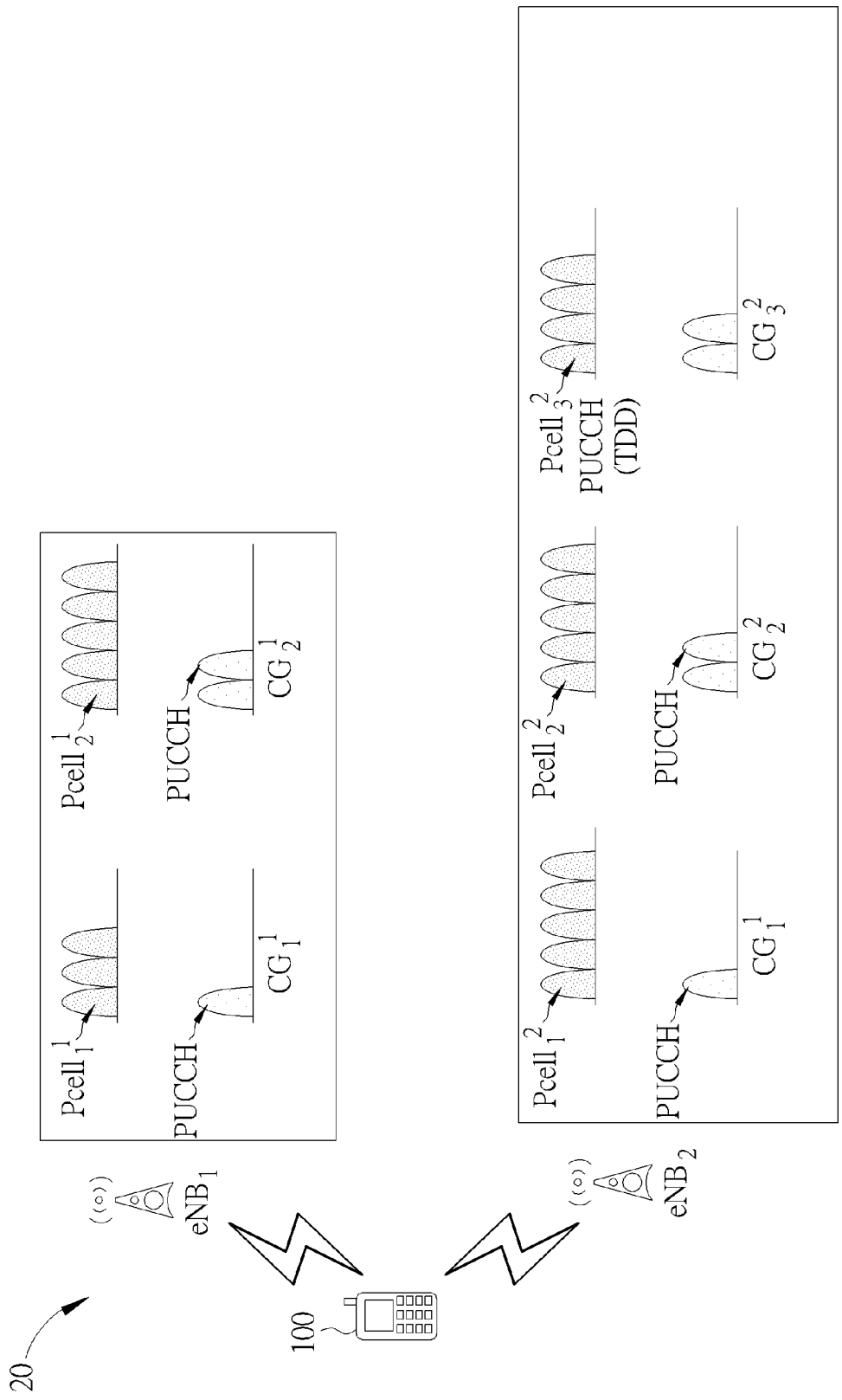
FIG. 2 is a schematic diagram of a carrier aggregation system according to an embodiment of the present invention.

When the UE 100 is applied to a carrier aggregation (CA) system 20 including multiple evolved Node-Bs $eNB_1$, $eNB_2$, the cells of FIG. 1 are grouped into cell groups $CG_1^1$, $CG_2^1$, $CG_1^2$, $CG_2^2$ and $CG_3^2$, as illustrated in FIG. 2. The cell group (CG) herein is defined as a set of aggregated downlink (DL) CCs within a same evolved Node-B, and includes at most a predetermined number K (K=5 in FIG. 2) of DL CCs. In FIG. 2, $eNB_1$ and $eNB_2$ represent aggregated eNBs, and $CG_j^i$ represents the jth CG within the $eNB_i$. In each of cell groups $CG_1^1$, $CG_2^1$, $CG_1^2$, $CG_2^2$ and $CG_3^2$, an uplink (UL) control information (UCI) feedback mechanism follows the legacy CA behavior. For example, in the cell group $CG_1^1$, one cell is selected to be a primary cell $Pcell_1^1$, which cannot be deactivated when at least one other cell in the corresponding cell group $CG_1^1$ is activated.

Figure 3:
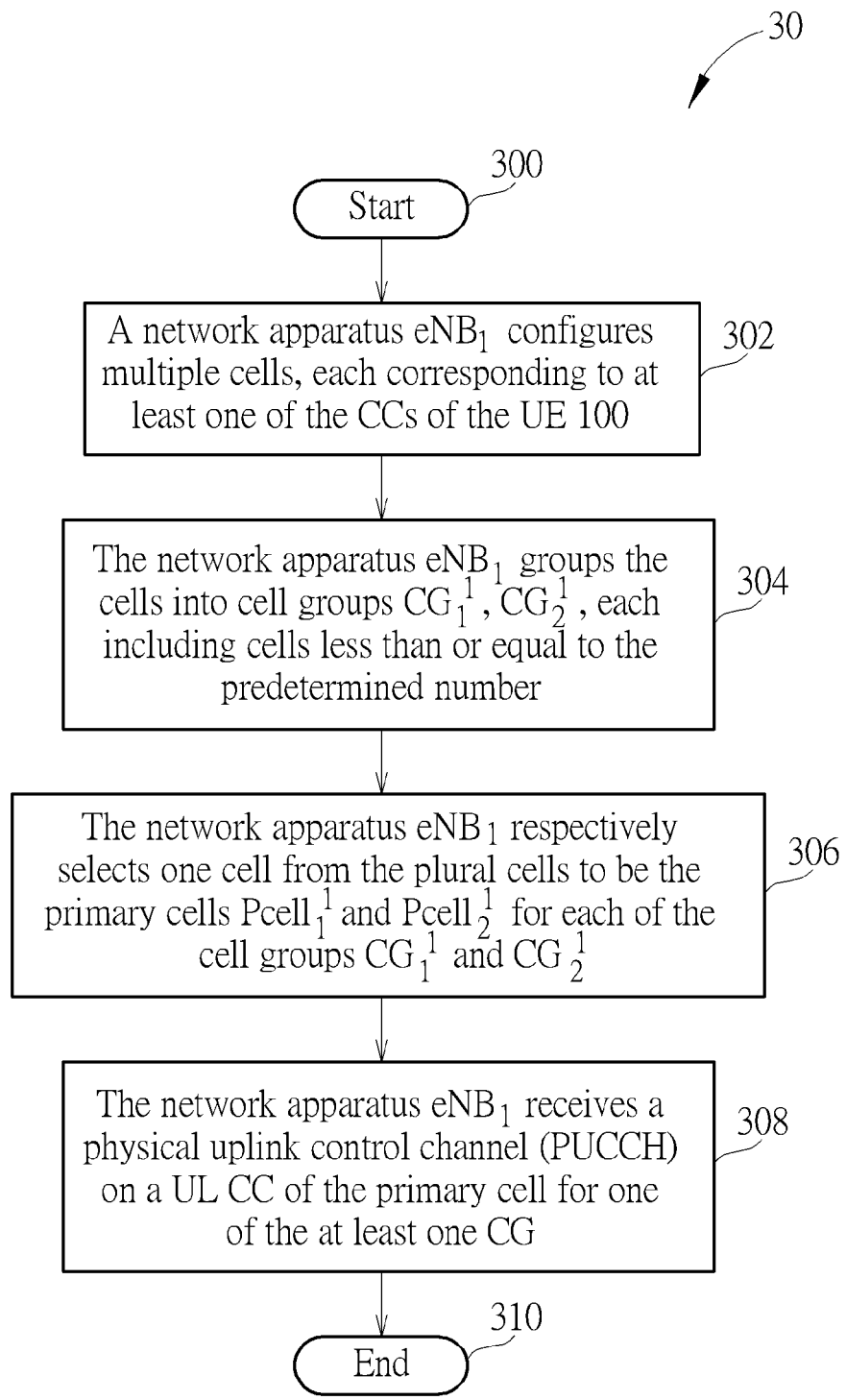
FIG. 3 is a flowchart of a process according to an embodiment of the present invention.

The spirit of grouping the cells shown in FIG. 2 can be summarized into a process 30 as illustrated in FIG. 3. The process 30 includes the following steps:

Step 300: Start.

Step 302: A network apparatus $eNB_1$ configures multiple cells, each corresponding to at least one of the CCs of the UE 100.

Step 304: The network apparatus $eNB_1$ groups the cells into cell groups $CG_1^1$, $CG_2^1$, each including cells less than or equal to the predetermined number.

Step 306: The network apparatus $eNB_1$ respectively selects one cell from the plural cells to be the primary cells $Pcell_1^1$ and $Pcell_2^1$ for each of the cell groups $CG_1^1$ and $CG_2^1$.

Step 308: The network apparatus $eNB_1$ receives a physical uplink control channel (PUCCH) on a UL CC of the primary cell for one of the at least one CG.

Step 310: End.

In order to solve the problem caused by the CA framework beyond 5 CCs, the cells are grouped by setting the predetermined number K=5, such that each cell group includes less than or equal to five cells. As a result, the requirement to accommodate all the physical uplink control channel (PUCCH) transmissions in the primary cell no longer hinders the development to future CA enhancement since the cells associated with the primary cell is less than or equal to five cells.

Figure 4:
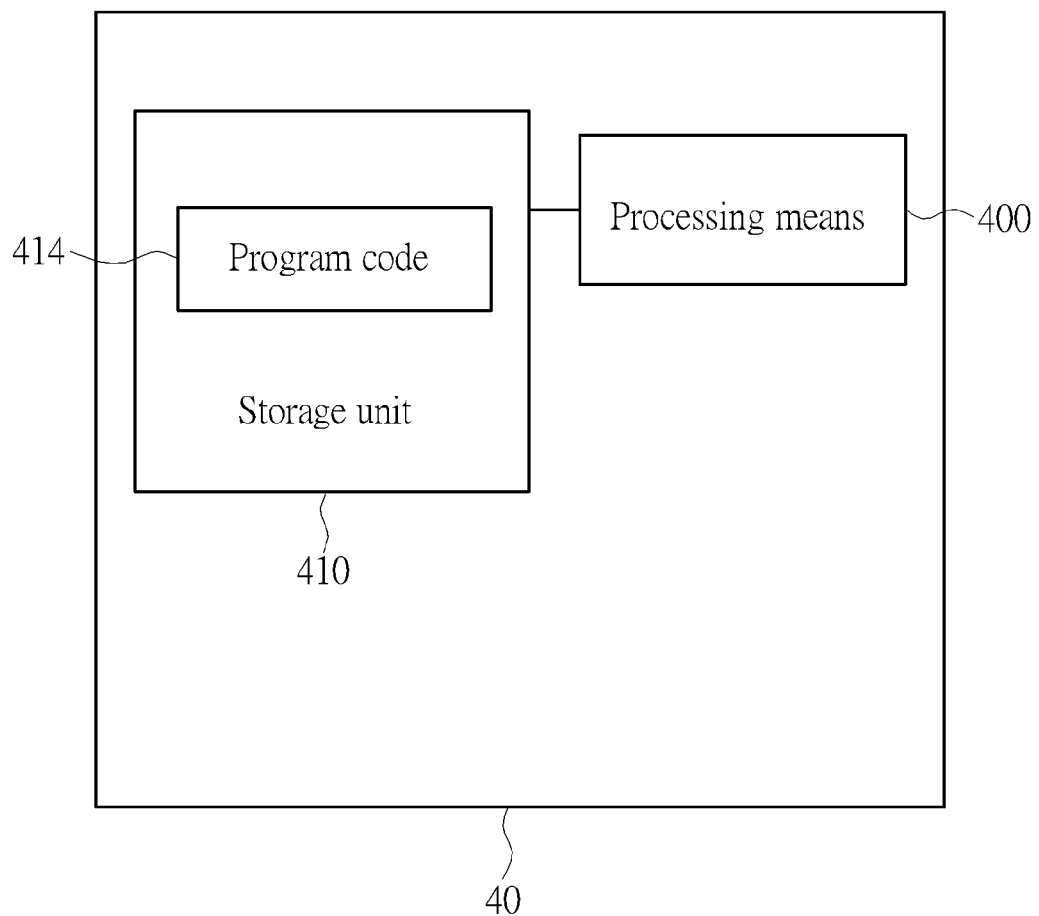
FIG. 4 is a schematic diagram of a network apparatus or a communication device according to embodiments of the present invention.

The process 30 can be performed by a network apparatus 40 as shown in FIG. 4. The network apparatus 40 includes a storage unit 410 and a processing means 420 such as a microprocessor or Application Specific Integrated Circuit (ASIC). The storage unit 410 may be any data storage device that may store a program code 414, accessed and executed by the processing means 420. The processing means 420 is configured to execute the instructions (Steps 300-308) stored in the storage unit 410.

For more details, in each of cell groups $CG_1^1$, $CG_2^1$, $CG_1^2$, $CG_2^2$ and $CG_3^2$, a CC corresponding to the primary cell $Pcell_j^1$ in the DL is a DL primary cell carrier (PCC), and is an uplink (UL) PCC in the UL. In frequency division duplexing (FDD) long-term evolution (LTE) system, the DL PCC and the UL PCC of the primary cell $Pcell_j^1$ are different in frequency domain. In comparison, in a time division duplexing (TDD) LTE system, the DL PCC and the UL PCC of the primary cell $Pcell_j^1$ are a same CC. For that reason, in an FDD cell, the UL PCC associated with the primary cell $Pcell_j^1$ is the only UL CC which can carry a physical uplink control channel (PUCCH) in the cell $CG_j^1$. On the contrary, in a TDD cell, the UL time slots in the primary cell $Pcell_j^1$ are the only resource which can carry the PUCCH in the cell $CG_j^1$. According to an embodiment, the FDD cell and the TDD cell may be in a same cell group.

However, the primary UL CCs associated with different primary DL CCs are distinct. In other words, the number of distinct CGs within an eNB is the same as the number of distinct UL frequency spectra which can carry the PUCCH. For example, in FIG. 2, the number of the CGs $CG_1^1$ and $CG_2^1$ within the evolved Node-B $eNB_1$ is two while there are two distinct UL frequency spectra for carrying the PUCCH in the CGs $CG_1^1$ and $CG_2^1$. Also, since the DL PCC and the UL PCC are the same in the TDD cell, TDD cells are included due to the distinct UL frequency spectra.

By setting the predetermined number K=5, maximum backward compatibility could be obtained since both the maximum number of CCs and the UCI feedback rule follow the legacy behavior. Alternatively, setting the predetermined number K>5 is also allowed for future forward compatibility when a design enhancement to the signaling format, hence capacity of PUCCH, happens. The number of CGs within the evolved Node-B eNBi is greater than or equal to $n_i/K_i$ where $n_i$ represents a number of DL CCs in the evolved Node-B eNBi. For example, according to the embodiment of FIG. 2, a total of 8 DL CCs are aggregated in the evolved Node-B $eNB_1$, and the number of CGs within the evolved Node-B eNB1 is $2 >= 8/5 = n_i/K$.

Figure 5:
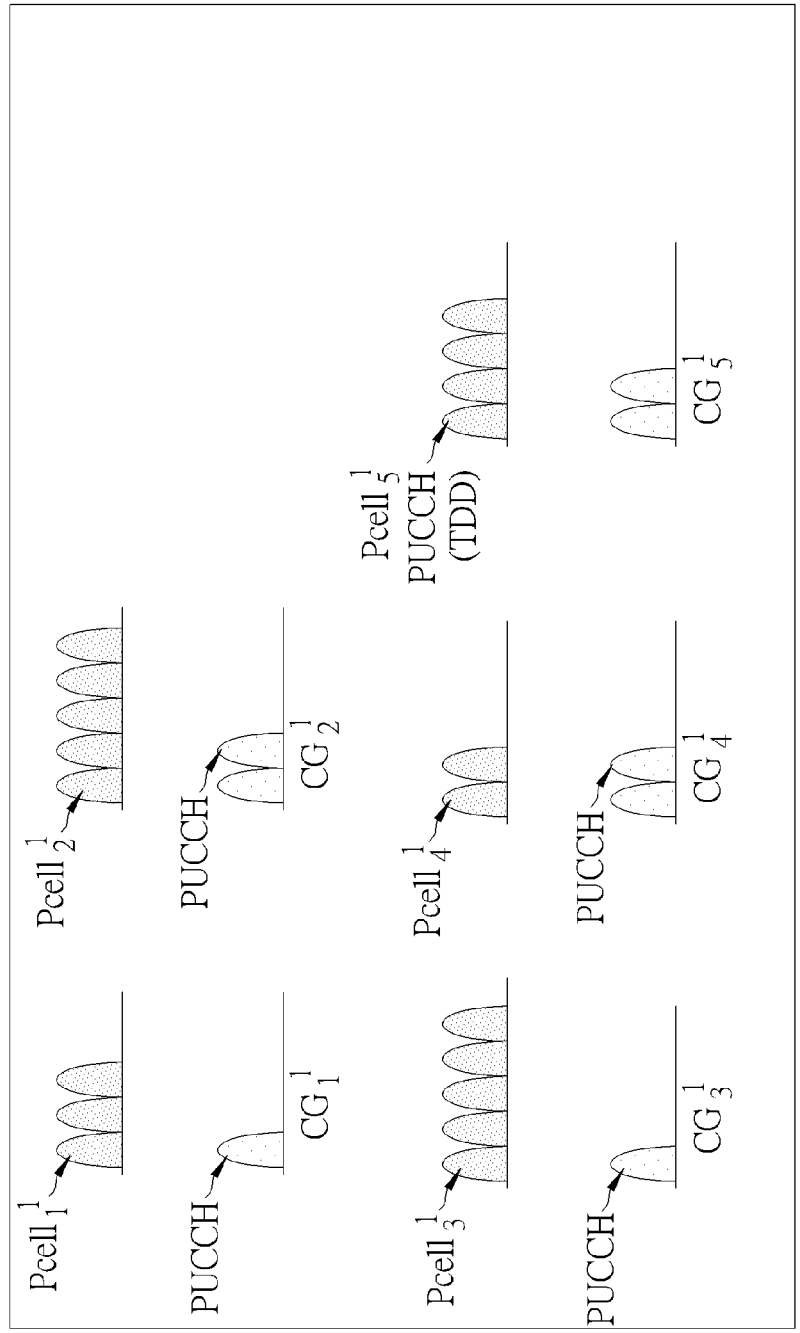
FIG. 5 is a schematic diagram of a carrier aggregation system according to an embodiment of the present invention.

FIG. 2 depicts an example where two evolved Node-Bs $eNB_1$, $eNB_2$ and a total of 19 DL CCs are aggregated. In such a situation, a total of 5 CGs are formed. Note that, one of the aggregated cell is a TDD cell. As another example, FIG. 5 depicts the case where a single evolved Node-B eNB1 and a total of 19 DL CCs are aggregated. Also, a total of 5 CGs are formed according to FIG. 5, and one of the aggregated cell is a TDD cell.

According to FIG. 2 and FIG. 5, the DL CCs and the UL CCs are grouped into different PUCCH CGs for the UE (100 or 500) in CA within an evolved Node-B and each PUCCH CG has a maximum of five cells, and only one of the five cells is configured to the UE to transmit the PUCCH. To distinguish the grouped CGs, when the evolved Node-B configures the cells to belong to a CG, which uses a same PUCCH of a cell of the CG, the evolved Node-B may explicitly or implicitly assign a CG identity (ID) to the CG in a RRC message (e.g. RRCConnectionReconfiguration). As such, the CG ID or a bit corresponding to the CG ID may be used in a medium access control (MAC) control element (CE). For example, the CG identity or the bit corresponding to the CG ID (called CG index) may be included in an activation/deactivation MAC CE to indicate that the CG is activated or deactivated. For another example, when a UE receives the activation/deactivation MAC CE which is a deactivation command, and contains the CG ID or the CG index is set to e.g. 1, the UE deactivates the CG, i.e. deactivates all cells of the CG. Alternatively the activation/deactivation MAC CE may include the CG ID or the CG index, and a cell index indicating a cell identified by the cell index in the CG identified by the CG ID or CG index is activated or deactivated. As a result, when a UE receives the activation/deactivation MAC CE, the UE can deactivate the cell of the CG based on the cell index. Accordingly, a new logical channel identity may be used in a sub-header of the activation/deactivation MAC CE in order to identify the activation/deactivation MAC CE.

Moreover, the evolved Node-B should not deactivate a cell of a CG on which the UE is configured to transmit PUCCH especially when another cell of the CG is still activated. In other words, the evolved Node-B may change the UE PUCCH transmission from a cell to another cell within a CG after the evolved Node-B deactivates all cell(s) of the CG.

According to an embodiment, the CG ID may be included in a power headroom reporting (PHR) MAC CE to indicate power headroom information of the cells in the CG. In other words, the UE configured with the CG ID transmits the CG ID in the PHR MAC CE. Accordingly, a new logical channel identity may be used in a sub-header of the PHR MAC CE in order to identify the PHR MAC CE.

According to another embodiment, the CG ID or CG index may be included in a discontinuous reception (DRX) command. Therefore, the evolved Node-B may request the UE to apply DRX for a specific CG by transmitting the DRX command including the CG ID or CG index. Accordingly, the evolved Node-B may configure a DRX configuration (e.g. DRX cycle) for each CG and the DRX configuration of each CG may be different.

Importantly, when determine which cell should be configured into a PUCCH CG, uplink transmission timing in cells is taken into consideration. Specifically, if the uplink transmission timing of two cells cannot be aligned, the evolved Node-B should not configure the two cells into in the PUCCH CG. In other words, the UE applies the same uplink transmission timing in the PUCCH CG to transmit the PUCCH in one cell of the PUCCH CG and PUSCH in another cell of the PUCCH CG. Furthermore, cells belonging to the same band or different bands may need to be considered. For example, cells belonging to the same band may be grouped into a CG and cells belonging to different bands may be grouped into different CGs.

Since some UEs can allow simultaneous PUCCH and physical uplink shared channel (PUSCH) transmission, the configuration for such UEs is independently configured for distinct evolved Node-Bs. Within an evolved Node-B, the configuration for such a UE is commonly across all the CGs. Taking the system of FIG. 1 and FIG. 3 as an example, if the UE 100 is configured such that the simultaneous PUCCH and PUSCH transmission is enabled for $eNB_1$ but not for $eNB_2$, the simultaneous PUCCH and PUSCH transmission is enabled for both $CG_1^1$ and $CG_2^1$ but not for $CG_1^2$, $CG_2^2$ and $CG_3^2$.

In the case that the simultaneous PUCCH and PUSCH transmission is disabled for an evolved Node-B $eNBi$ and at least one valid UL grant from the evolved Node-B $eNBi$ is received by the UE, all of the PUCCHs across different CGs within the evolved Node-B $eNBi$ are routed to only one UL data channel, i.e., one PUSCH.

In the case that the simultaneous PUCCH and PUSCH transmission is enabled for the evolved Node-B $eNBi$ and at least one valid UL grant from the evolved Node-B $eNBi$ is received by the UE, a part of the UCIs, e.g., CSIs, across different CGs within the evolved Node-B $eNBi$ are routed to have only one PUSCH.

On the other hand, when more than one valid UL grants are received within the evolved Node-B $eNBi$, which means that there are multiple PUSCHs to be transmitted, the principle for determining the PUSCH for carrying the routed UCIs could be based on the smallest UL CC ID number.

Note that, UCIs associated with an evolved Node-B are not routed to a PUSCH associated with another evolved Node-B.

Since transmission power is limited for each UE, UL power allocation of UE also has to be considered under the process 30. First, a priority order is determined among all the evolved Node-Bs. For example, the priority order of the evolved Node-Bs can be determined based on an order of ID numbers of the evolved Node-Bs. In such a situation, all the CGs within the evolved Node-B having a higher priority will have higher priorities over all the CGs within a lower priority evolved Node-B when performing UL power allocation. In each evolved Node-B, a priority order among the CGs is also determined based on the cell index of the CGs, which means that an ID-based priority rule can be similarly applied to the CGs.

Note that, the priority order can be UE-specific, which means that different UEs can have different priority orders for the same group of aggregated evolved Node-Bs and CGs.

More specifically, let $P_{cmax}$ denote a UE maximum total output power, and $P_{cmax}$ can be configured using higher layer signaling. A minimum guaranteed power for an evolved Node-B $eNB_i$ is defined and denoted by $P\_eNB_i$, which can be represented as ratios of the UE maximum total output power $P_{cmax}$ (in %). In such a situation, at least the following three cases are allowed according to the present invention.

$\Sigma_i P\_eNB_i \leq 100\%$
$P\_eNB_i = 100\%$
$P\_eNB_i = 0$

However, $\Sigma_i P\_eNB_i > 100\%$ is not allowed according to the present invention.

In addition to the minimum guaranteed power per evolved Node-B, a minimum guaranteed power for each CG is also defined and denoted by $P\_CG_j^i$, which represents the minimum guaranteed power of the cell group $CG_j^i$. The minimum guaranteed power $P\_CG_j^i$ also can be represented as ratios of the minimum guaranteed power for the parent evolved Node-B $eNB_i$, i.e. $P\_eNBi$ (in %). In such a situation, at least the following three cases are allowed according to the present invention.

$\Sigma_j P\_CG_j^i \leq 100\%$
$P\_CG_j^i = 100\%$
$P\_CG_j^i = 0$

Similarly, $\Sigma_j P\_CG_j^i > 100\%$ is not allowed according to the present invention.

Figure 6:
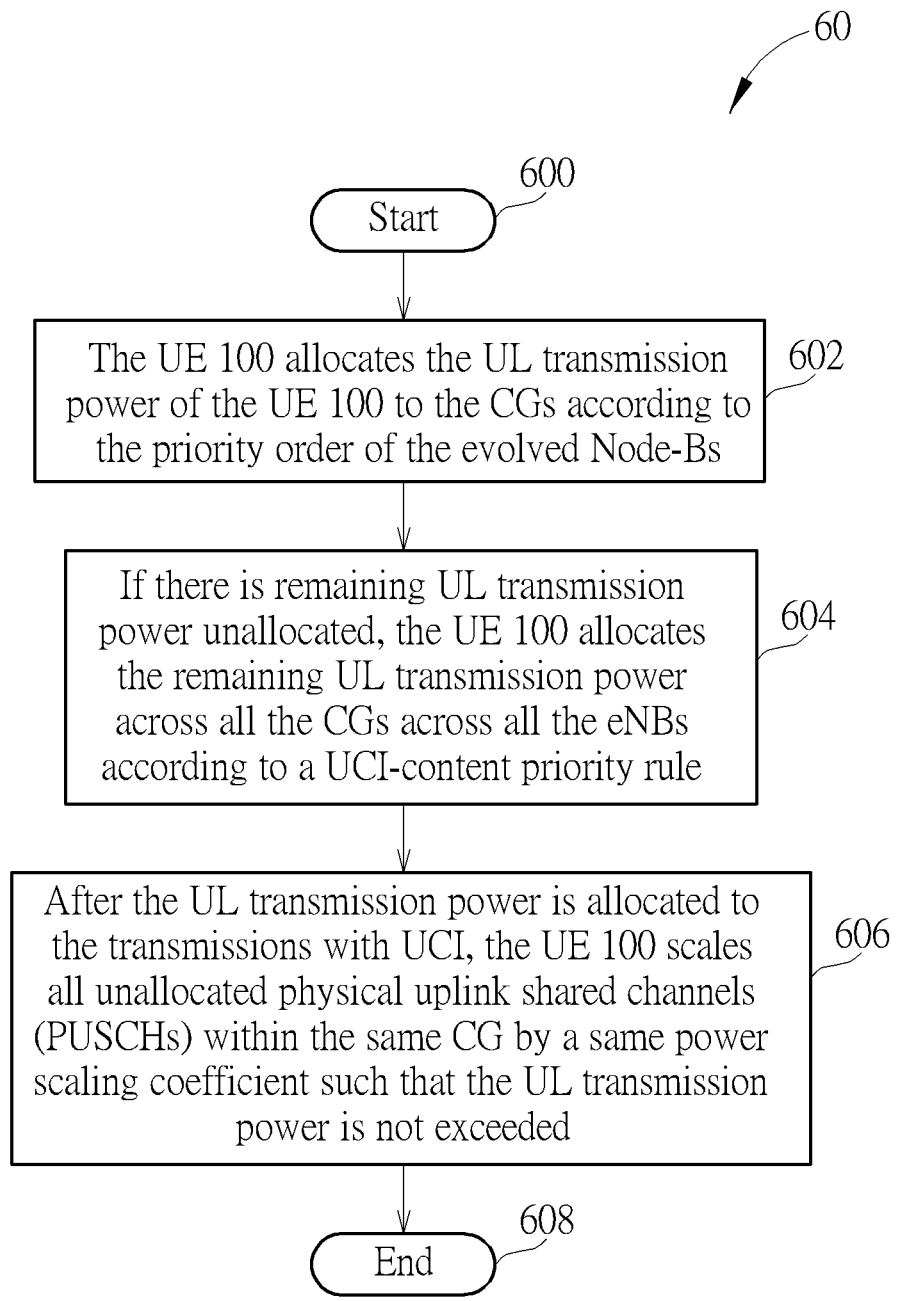
FIG. 6 is a flowchart of an allocation process according to an embodiment of the present invention.

Please refer to FIG. 6, which is a flowchart of an allocation process 60 for UL transmission power of the UE 100. The allocation process 60 includes the following steps:

Step 600: Start.

Step 602: The UE 100 allocates the UL transmission power of the UE 100 to the CGs according to the priority order of the evolved Node-Bs.

Step 604: If there is remaining UL transmission power unallocated, the UE 100 allocates the remaining UL transmission power across all the CGs across all the eNBs according to a UCI-content priority rule.

Step 606: After the UL transmission power is allocated to the transmissions with UCI, the UE 100 scales all unallocated physical uplink shared channels (PUSCHs) within the same CG by a same power scaling coefficient such that the UL transmission power is not exceeded.

Step 608: End.

More specifically, in Step 602, in each evolved Node-B, the UE 100 performs UL power allocation for each CG up to the minimum guaranteed power of the CG according to the CG priority order until the UL power of the UE 100 is depleted or all the CGs have been addressed. In such a situation, $Ppre\_CG_j^i = \min\{$power based on actual grant/assignment and TPC commands, $Ppre\_CG_j^i$, remaining UE UL power$\}$, where $Ppre\_CG_j^i$ represents an actual power allocated to $CG_j^i$ in Step 602.

In Step 604, the UCI-content priority rule includes:

At least for PUCCH/PUSCH, remaining power is allocated on a per-transmission basis. The priority rule for PUCCH/PUSCH across CGs to utilize remaining power is as the followings: HARQ-ACK=SR>CSI>PUSCH without UCI.

If a channel has more than one type of UCI, the prioritization across CG is based on the highest priority UCI type. If the same UCI type collides, the priority is determined based on the CG priority rule described previously.

In Step 606, the UL transmission power for all the PUSCHs within the same CG is to be scaled using the scaling coefficient. According to an embodiment, different CGs have the same power scaling coefficient. Such a power scaling coefficient in general ranges from 0 to 1. The exact power scaling coefficients, maximum of the coefficients, and minimum of the coefficients can be configured by the evolved Node-Bs using higher layer signaling or by physical layer signaling (e.g., DCI). Such power scaling coefficients can also be autonomously decided by the UE 100.

Note that, the allocation process 60 can be performed by the UE 100 which has a structure identical to the network apparatus 40 shown in FIG. 4.

To sum up, in order to solve the problem caused by the CA framework beyond 5 CCs, the cells are grouped, such that each cell group includes less than or equal to five cells. As a result, the requirement to accommodate all the PUCCH transmissions in the primary cell no longer hinders the development to future CA enhancement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network apparatus, communicating with a user equipment (UE) via a plurality of component carriers (CCs), the network apparatus comprising:
   a storage unit for storing instructions of:
      configuring a plurality of cells, each corresponding to at least one of the plurality of CCs;
      grouping the plurality of cells into at least one cell group (CG), wherein each of the at least one CG comprises cells less than or equal to a predetermined number;
      selecting one cell from the plurality of cells to be a primary cell for one of the at least one CG; and
      receiving a physical uplink control channel (PUCCH) on an uplink (UL) CC of the primary cell for one of the at least one CG;
   a processing means, coupled to the storage unit, configured to execute the instructions stored in the storage unit;
   wherein a number of CGs within the network apparatus is greater than or equal to a number of downlink (DL) CCs in the network apparatus divided by the predetermined number.

2. The network apparatus of claim 1, wherein the predetermined number is 5.

3. The network apparatus of claim 1, wherein the primary cell cannot be deactivated when at least one other cell in the corresponding CG is activated.

4. The network apparatus of claim 1, wherein a downlink (DL) CC and the UL CC of the primary cell are different in frequency domain if the primary cell is a frequency division duplexing (FDD) cell.

5. The network apparatus of claim 1, wherein a downlink (DL) CC and the UL CC of the primary cell are an identical cell if the primary cell is a time division duplexing (TDD) cell.

6. The network apparatus of claim 1, wherein the storage unit further stores an instruction of:
   assigning a CG identity (ID) to one of at least one CG.

7. The network apparatus of claim 6, wherein the storage unit further stores an instruction of:
   assigning a cell index to one of the cells belonging to the CG.

8. The network apparatus of claim 7, wherein the storage unit further stores an instruction of:
   determining a priority order of the at least one CG according to the cell index of the at least one CG.

9. The network apparatus of claim 6, wherein the storage unit further stores an instruction of:
   transmitting a discontinuous reception (DRX) command comprising the CG ID to the UE.

10. The network apparatus of claim 9, wherein the storage unit further stores an instruction of:
    configuring a DRX configuration for one of the at least one CG.

11. The network apparatus of claim 1, wherein the storage unit further stores an instruction of:
    if the UE is configured to enable simultaneous physical uplink control channel (PUCCH) and physical uplink shared channel (PUSCH) transmission for the network apparatus, enabling the simultaneous PUCCH and PUSCH transmission for all CGs associated with the network apparatus.

12. The network apparatus of claim 1, wherein the storage unit further stores an instruction of:
    if the UE is configured to disable simultaneous physical uplink control channel (PUCCH) and physical uplink shared channel (PUSCH) transmission for the network apparatus, routing all of the PUCCHs across different CGs within the network apparatus to have only one PUSCH.

13. The network apparatus of claim 1, wherein the storage unit further stores an instruction of:
    if the UE is configured to enable simultaneous physical uplink control channel (PUCCH) and physical uplink shared channel (PUSCH) transmission for the network apparatus, and at least one valid UL grant from the network apparatus is received by the UE, routing a part of uplink control information (UCI) across different CGs within the network apparatus to have only one PUSCH.

14. The network apparatus of claim 1, wherein the storage unit further stores an instruction of:
when more than one valid UL grants are received within the network apparatus, determining the PUSCH for carrying routed uplink control information (UCI) according to a smallest UL CC ID number.

15. The network apparatus of claim 1, wherein the storage unit further stores an instruction of:
determining a priority order of the at least one CG according to an identity number of the network apparatus.

* * * * *